United States Patent
Luo et al.

(10) Patent No.: US 7,280,567 B2
(45) Date of Patent: Oct. 9, 2007

(54) HIGH-POWER RED, ORANGE, GREEN, BLUE (ROGB) FIBER LASERS AND APPLICATIONS THEREOF

(75) Inventors: Ningyi Luo, Fremont, CA (US); Feng Zhou, Kittanning, PA (US); Sheng-Bai Zhu, Fremont, CA (US); Yuxing Zhao, Suzhou (CN)

(73) Assignee: Pavilion Integration Corporation

( * ) Notice: Subject to any disclaimer, the term of this patent is extended or adjusted under 35 U.S.C. 154(b) by 457 days.

(21) Appl. No.: 11/077,291

(22) Filed: Mar. 10, 2005

(65) Prior Publication Data

US 2005/0201427 A1    Sep. 15, 2005

Related U.S. Application Data

(60) Provisional application No. 60/552,767, filed on Mar. 12, 2004.

(51) Int. Cl.
    *H01S 3/30* (2006.01)
(52) U.S. Cl. ............................................. 372/6; 372/23
(58) Field of Classification Search ................... 372/6, 372/102, 5, 97, 20, 37, 23
    See application file for complete search history.

(56) References Cited

U.S. PATENT DOCUMENTS

| | | | |
|---|---|---|---|
| 5,067,134 A | | 11/1991 | Oomen |
| 5,226,049 A | * | 7/1993 | Grubb .......................... 372/6 |
| 5,530,709 A | | 6/1996 | Waarts |
| 5,677,920 A | * | 10/1997 | Waarts et al. .................. 372/6 |
| 6,661,819 B1 | * | 12/2003 | Ventrudo et al. ............. 372/32 |
| 6,771,687 B1 | * | 8/2004 | Mohrdiek .................... 372/97 |

OTHER PUBLICATIONS

Whitley et al., Electronics Letters 27 (20), Sep. 26, 1991, pp. 1785-1786.
D. Piehler et al., "Green laser diode pumped erbium laser" Compact Blue-Green Lasers conference, 1994, Salt Lake City, Utah.
Zellmer et al, Electronics Letters 34, Mar. 19, 1998, pp. 565-567.

* cited by examiner

*Primary Examiner*—Minsun Oh Harvey
*Assistant Examiner*—Tuan N. Nguyen

(57) ABSTRACT

An all-fiber device platform for producing high-power ROGB or RGB laser output comprises an optical fiber including multiple waveguide gain regions embedded within a common inner cladding and within an outer cladding, an optical cavity defined by dielectric reflectors and/or FBG mirrors, and a pump source for exciting one or more active ionic species by one or multiple pump wavelengths from one or both ends of the optical fiber through upconversion process. An apparatus for producing sequential or simultaneous multiple wavelength laser operation provides for applications of color projection displays and biomedical or other instrumentation.

19 Claims, 10 Drawing Sheets

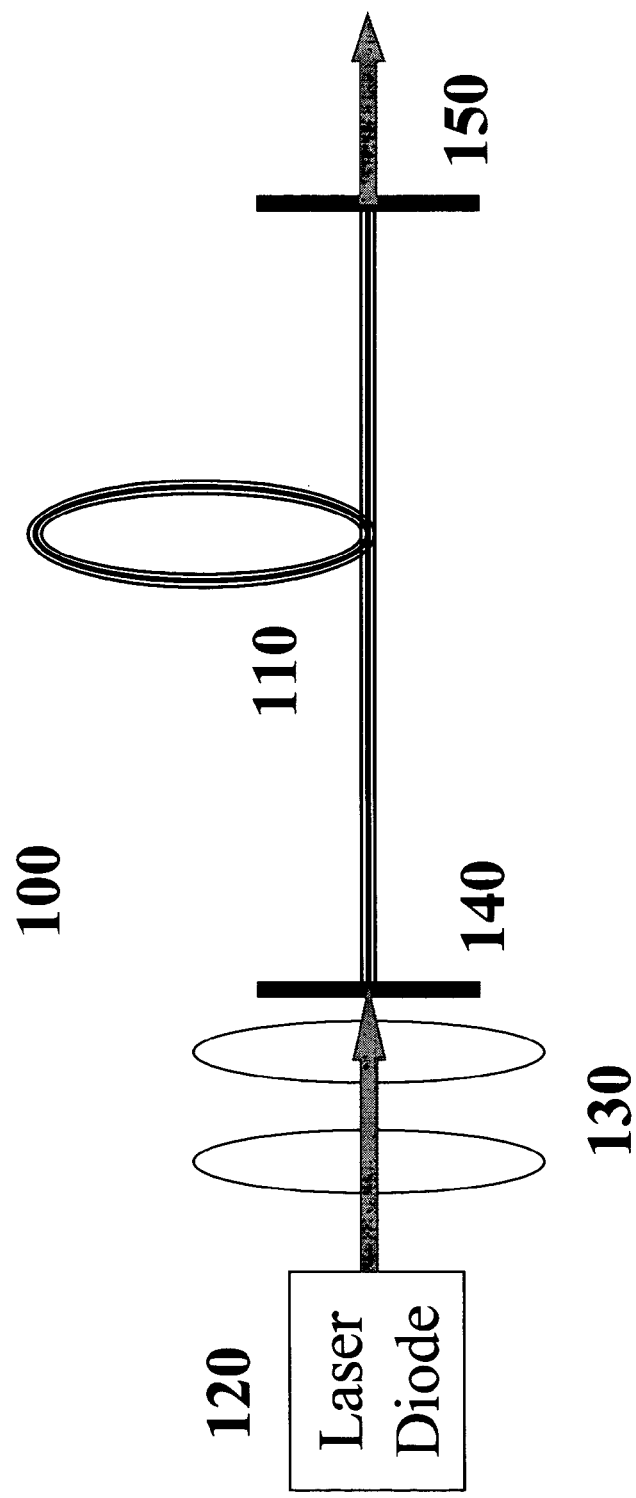

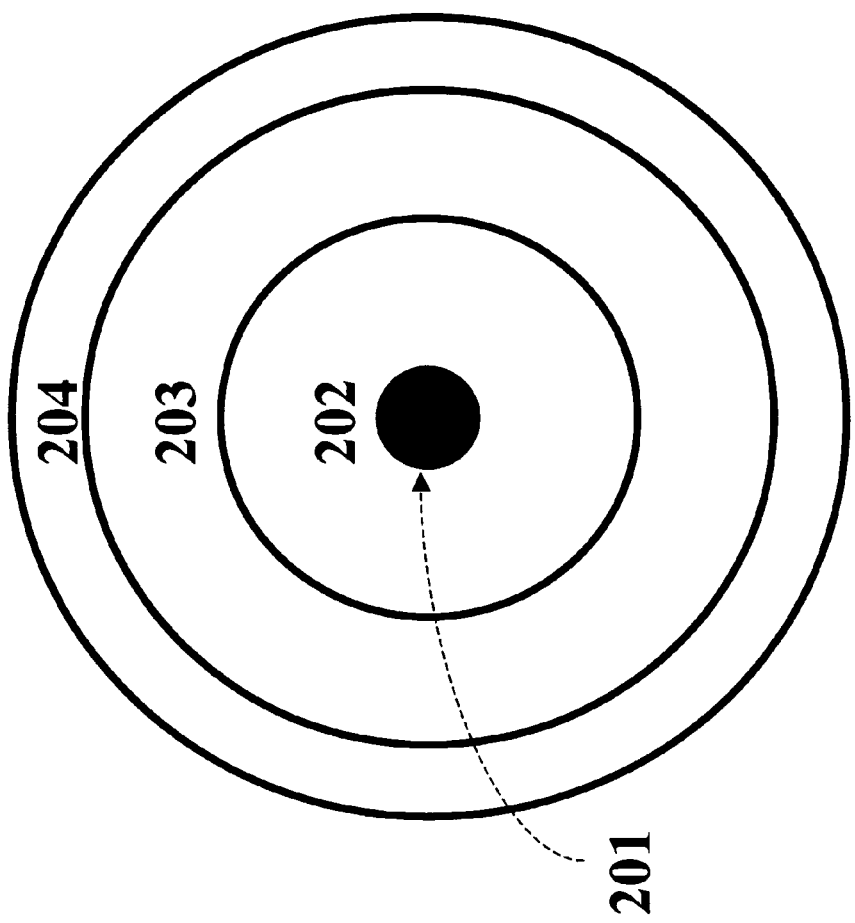

FIG 2B
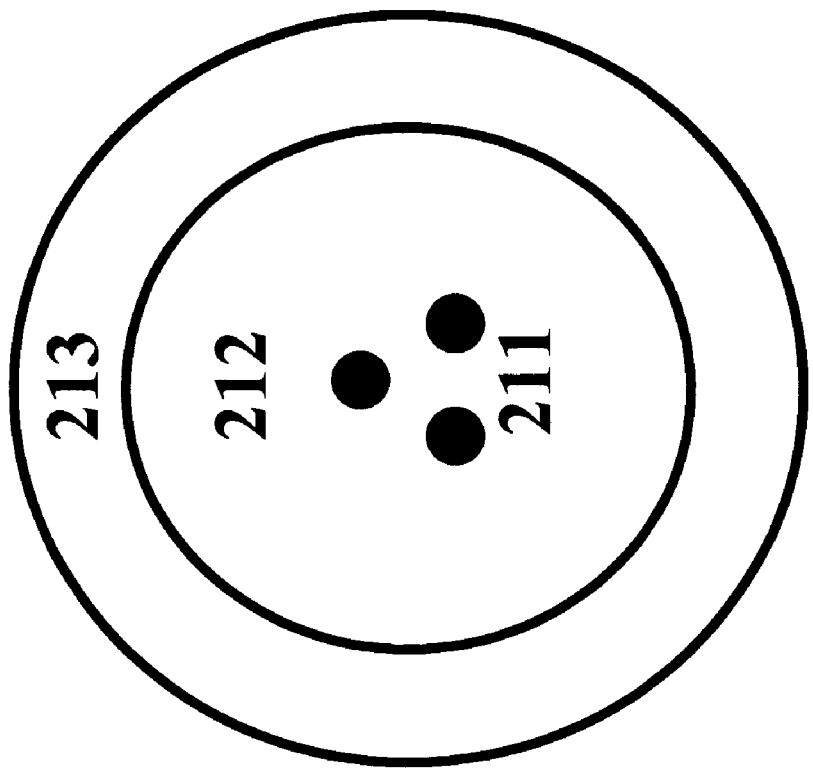
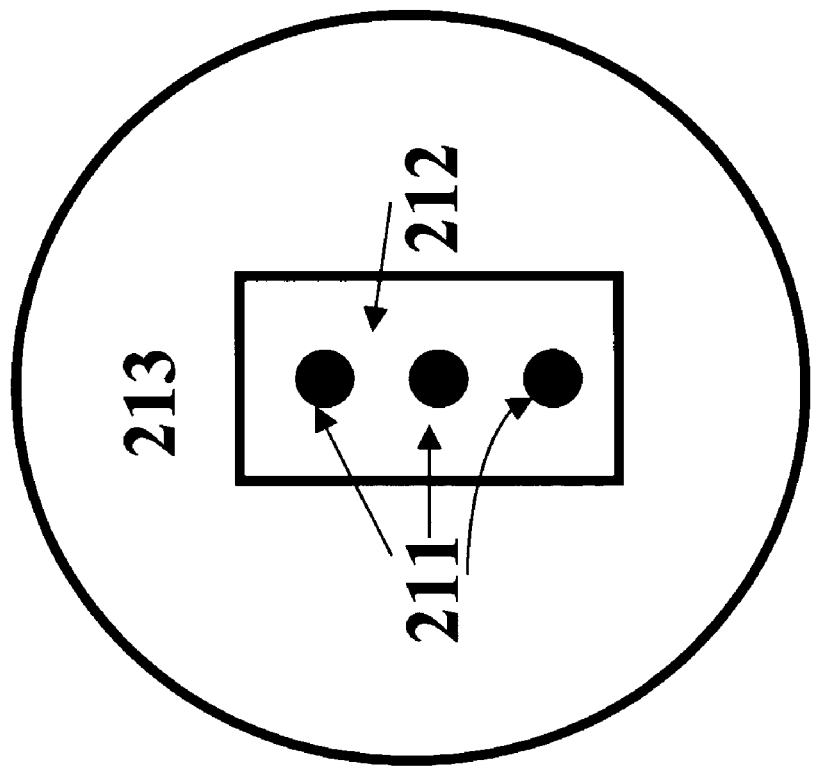

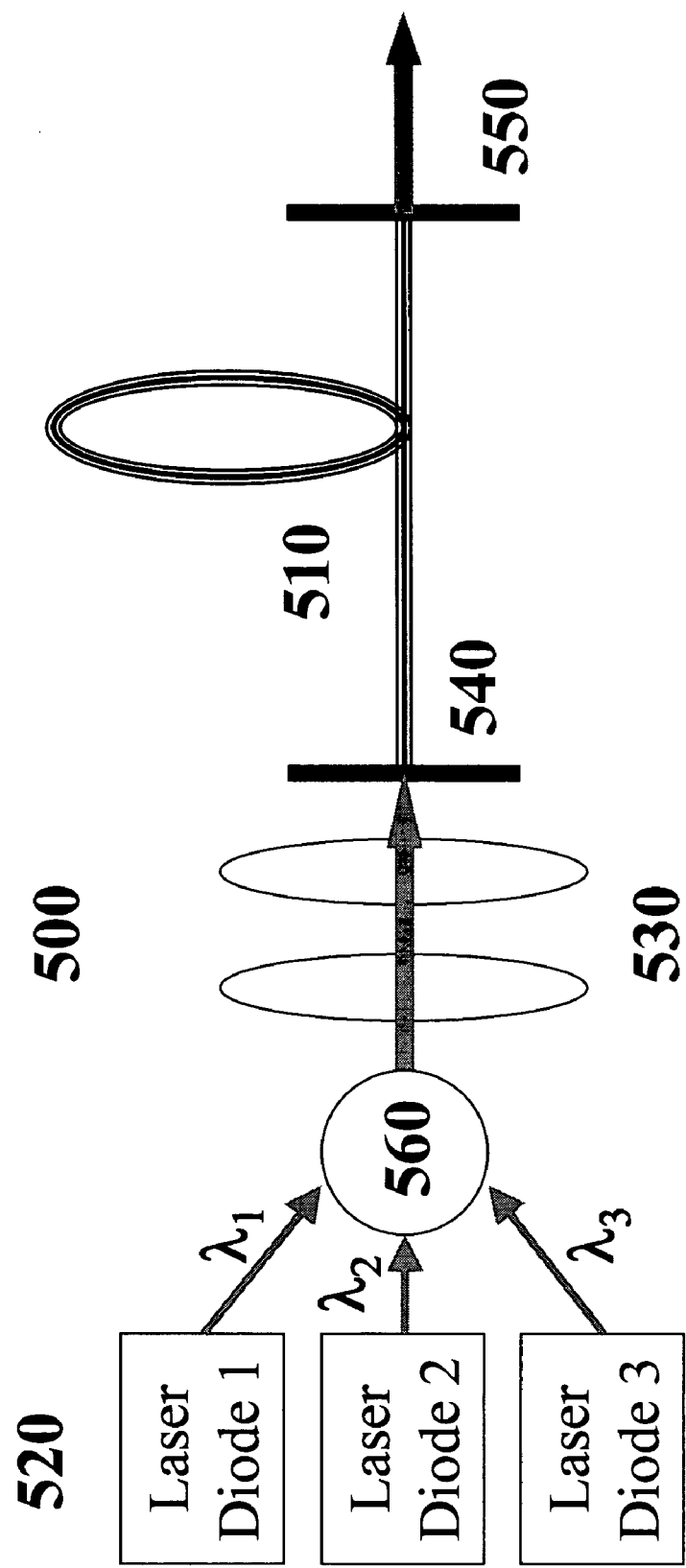

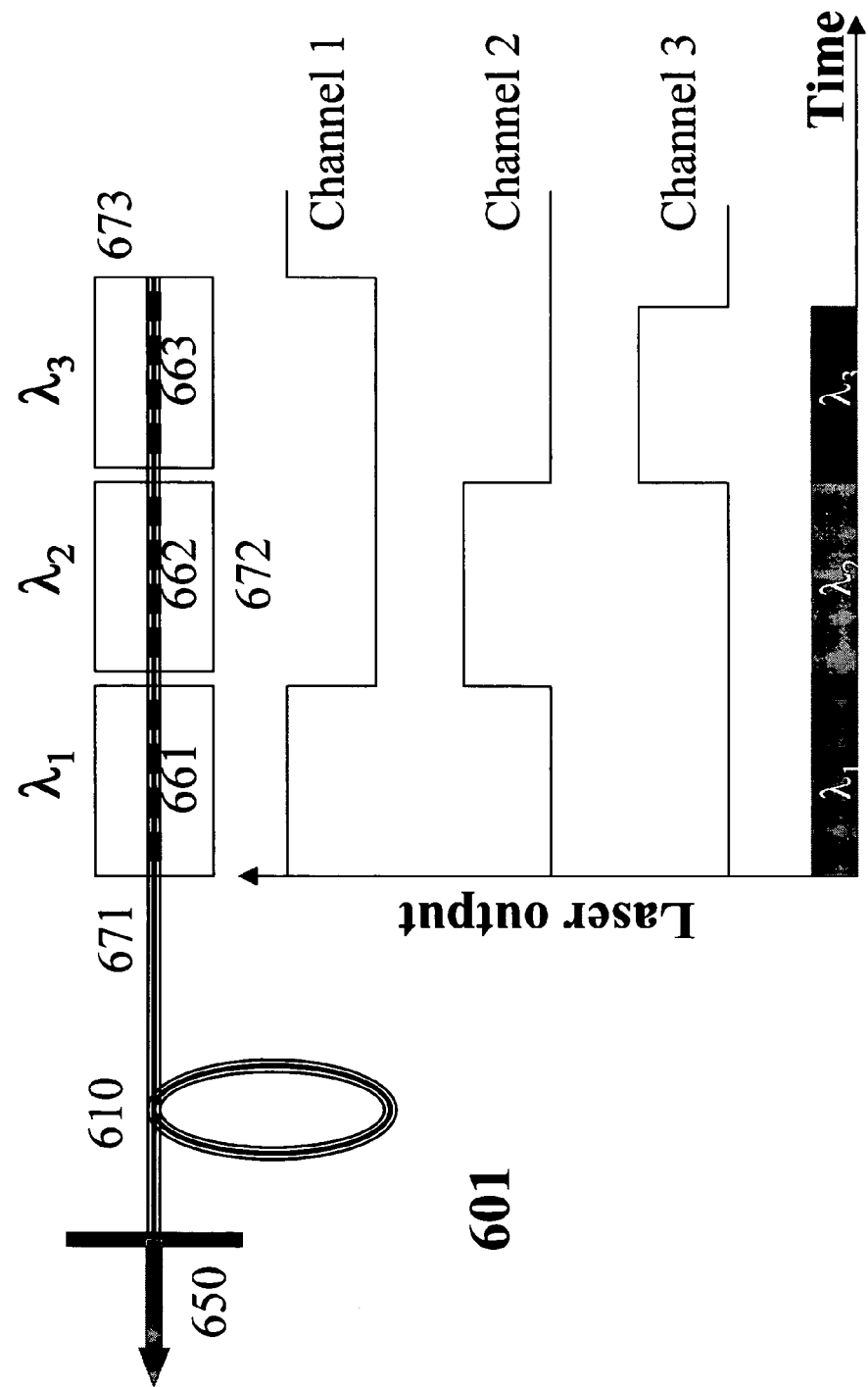

HIGH-POWER RED, ORANGE, GREEN, BLUE (ROGB) FIBER LASERS AND APPLICATIONS THEREOF

CROSS REFERENCE TO RELATED APPLICATIONS

This application claims the benefit of U.S. Provisional Application No. 60/552,767 filed on Mar. 12, 2004, the contents of which are incorporated herein by reference.

FIELD OF THE INVENTION

This invention relates, in general, to multi-color red (R), orange (O), green (G) and blue (B) lasers and, in particular, to power balanced multiple color fiber lasers.

BACKGROUND OF THE INVENTION

Historically, there have been essentially three approaches to generation of red, green and blue lasers. The first approach uses gas lasers, which have drawbacks such as high operating voltage, large footprint and short lifetime. The second approach employs second harmonic generation or sum frequency generation of infrared solid-state lasers. This approach is very complex with a high cost. In addition, laser performance may be instable, causing problems such as speckles in display systems. The third approach uses semiconductor laser diodes with or without frequency doubling. Unfortunately, the output powers of blue-green semiconductor lasers are limited due to degradation and optical damage of semiconductor laser materials under high electric stress and optical power density. If frequency doubling is involved, the system also shares the instability characteristic.

Upconversion fiber lasers (UFL), which provide for a reliable and efficient compact source of visible laser light at potentially low cost, are a promising alternative to the above-mentioned approaches. In conventional single-step optical pump processes, one pump photon is absorbed by one active ion for excitation to its upper laser level. Consequently, the laser emission always exhibits lower photon energy, i.e. longer wavelength, compared to the pump light. In contrast, the upconversion pump process is a multi-step process, in which more than one photons excite one active ion to the upper laser level and the laser light usually has a shorter wavelength than the pump light has. Common upconversion processes include excited-state absorption of a second photon by the active ion, also called "two-step absorption", dipole-dipole cross-relaxation interactions between two excited ions (not necessarily the same atomic species), and avalanche absorption, which is a combination of both excited-state absorption and interionic cross-relaxation.

Upconversion fiber lasers using rare earth ion doped single-mode fluoride-glass fibers have been demonstrated in the visible wavelengths. In U.S. Pat. No. 5,067,134, Oomen described a diode-pumped thulium upconversion fiber laser operated at about 450 nm. In U.S. Pat. No. 5,226,049, Grubb described thulium and holmium co-doped upconversion fiber lasers, pumped by a laser diode emitting 1120 nm radiation or a Nd:YAG laser, to produce laser light of approximately 480 nm or 650 nm and 550 nm. Whitley et al., in Electronics Letters (1991), described an erbium upconversion fiber laser, pumped by an 801 nm laser diode and emitting 546 nm laser radiation. Piehler et al., in an article entitled "Green laser diode pumped erbium fiber laser" presented at the Compact Blue-Green Lasers conference 1994, described an erbium-doped fluoride fiber upconversion laser, pumped by a 971 nm laser diode through fiber coupling and operated at 544 nm. Piehler et al. also reported a praseodymium-doped fluoride fiber upconversion laser, simultaneously pumped by two laser diodes of different wavelengths to produce either 635 nm or 521 nm laser emission.

Single-mode rare-earth-ion doped fluoride-glass fibers are preferred media for upconversion. Because of their relatively slow vibrational decay rates, these materials have long excited-state lifetimes and a relative abundance of metastable intermediate states required for effective upconversion. Upconversion efficiency increases with pump intensity. Single-mode fibers (core diameter of 5 μm or less) can confine pump and laser radiations to a very small area over the length of these fibers (often several meters long), thus create very high optical intensities and large single-pass gains from only modest pump powers. This makes room temperature CW operation of an upconversion laser possible.

However, low melting point of fluoride glass fibers and the coupling losses caused by NA incompatibility between single mode fibers and high power laser diodes or laser diode arrays severely limit the power scaling in single clad, rare earth ion doped monomode fibers. In order to reduce the pump power density while scale-up the pump power, a larger fiber core diameter is needed. However, this will lead to multimode operation and, therefore, reduce beam quality.

To overcome these beam quality and power scaling related difficulties, specially configured double clad fluoride-glass fibers, which comprise a single mode core doped with rare earth ions and a surrounded inner cladding with a refractive index lower than the core index, have been proposed. The pump radiation is directed into the inner cladding area, which has an NA and cross section compatible with those of high power laser diodes or arrays. Multimode pump light from a high power diode laser array is converted to a single transverse mode laser output from a single mode core of the double clad fiber. Such fiber lasers can achieve high output powers. In U.S. Pat. Nos. 5,530,709 and 5,677,920, Waarts et al described an upconversion fiber laser using a double clad fiber structure. Zellmer et al, in Electronics Letters (1998), reported a Pr/Yb co-doped double-clad upconversion fiber laser operating at 635 nm. An output power of 440 mW was obtained when 3 W pump light at 840 nm was injected into a 25 μm inner pump cladding.

For projection display applications, much higher outputs at RGB wavelengths are required. In addition, multicolor visible laser light should be produced simultaneously or sequentially in a controllable manner. Furthermore, such systems have to be compact, low power consumption, stable, and low cost. These problems will be addressed in the present invention.

SUMMARY OF THE INVENTION

It is therefore an object of the present invention to provide a stable, high-power, compact, and low-cost Red, Orange, Green, Blue (ROGB) fiber laser.

It is a further object of the present invention to provide an all-fiber device platform for producing visible laser output at multiple wavelengths required by applications such as biotech instrumentation and color projection displays.

It is another object of the present invention to provide a means for multimode pumping of multiple cladding fiber lasers.

It is still another object of the present invention to provide an apparatus for producing multicolor visible laser light simultaneously or sequentially in a controllable manner.

It is yet another object of the present invention to provide a method for controlling the power balance between multi colors to meet the needs of various applications.

To achieve the foregoing and other objects, and in accordance with the purposes of the present invention, as embodied and broadly described herein, the inventive laser comprises a fiber with rare earth ions doped cores as gain media, a laser cavity for providing optical resonance at desired lasing wavelengths, and at least one semiconductor laser as pumping source(s).

According to one preferred embodiment of the present invention, a diode pumped upconversion fiber laser uses multiple clad fibers with one or multiple gain regions. In an upconversion process, the large-mode-area (LMA) active fiber cores provide laser gain and the surrounded inner cladding acts as a large diameter waveguide to match the multimode high power pump light. Each waveguide gain region is doped with an active lasing ionic species, which preferably supports only one single transverse mode of each laser light at one of the RGB or ROGB wavelengths. The multiple waveguide gain regions are formed within an inner cladding and a low loss outer cladding. Said inner cladding has a refractive index lower than that of the waveguide gain regions for upconversion laser light confinement and for low loss delivering of the pump light. Said outer cladding is made of glass with a refractive index lower than that of the inner cladding and is used to surround the inner cladding for confining the pump light to the inner cladding and waveguide gain regions. Finally a polymer layer is used to protect the outer cladding. With this approach, power scaling is relatively easy and optical alignment is much relaxed. The refractive indexes of the core, inner cladding and outer cladding are matched such that the large-mode-area core will still support the single mode operation at the laser wavelength.

According to our inventive teachings and, in particular, with multiple-clad fibers, undesired thermal effects, caused by high power multimode or broad-area laser diode pump sources and high power diode-laser-pumped fiber-laser pump sources, are reduced. Advantageously, laser-diode-based pump sources are optically coupled at one end of the inner clad fiber to both the waveguide gain regions and inner cladding of the fiber, which allows the use of a high pump power to increase excitation intensities in the fiber gain regions and therefore to improve upconversion power.

The pump power can be further increased with combination of multiple pump sources. In one configuration of the present invention, two pump sources of same wavelength but with crossed linear polarizations are combined in a polarization beam combiner (PBC) to double the pump brightness. In another configuration of the present invention, lights from two or more pump sources with different wavelengths within the broad pump absorption band of the active ions are combined in a wavelength-division multiplexer (WDM) before being coupled into the optical fiber. In another configuration of the present invention, a combination of these two techniques is employed. In still another configuration of the present invention, pump beams are combined in a fiber bundle. In yet another configuration of the present invention, pump light is injected into both ends of the fiber.

According to our inventive teachings, the resonant cavity for the upconversion fiber laser may be formed between external mirrors, reflective coatings on the end surfaces of the fibers, butt-coupled fiber Bragg gratings (FBG) formed within silica fibers, or FBGs within the same fluoride fiber. These cavity reflectors are reflective to the upconversion laser wavelengths and any desired co-lasing wavelengths and are transmissive to the pump wavelengths at the pump light input end (or ends) of the fiber. The resonant cavity may contain entire laser fiber to form a simple laser or contain only a portion of the fiber to form a master oscillator power amplifier (MOPA) configuration, wherein the fiber portion lying outside of the cavity serves as an optical power amplifier for amplifying the upconversion laser light generated from the master oscillator portion of the fiber within the laser cavity.

Advantageously, the waveguide gain regions may be doped or co-doped with same active laser ionic species that will lase at the same wavelength, or different active laser ionic species that will lase at different wavelengths to offer multicolor light such as RGB or ROGB. The inner cladding may also be either doped or co-doped with active laser ionic species as a conventional (non-upconversion) laser or upconversion laser. When a pump light from laser diodes is injected into the inner cladding, the inner cladding can generate laser light within the inner clad cavity, which in turn falls within the absorption band of the upconversion laser and serves as pump light for upconversion of other active laser ionic species in the waveguide gain regions within the inner clad.

According to another preferred embodiment of the present invention, a holey optical fiber is used for light confinement along the optical fiber core regions. A holey fiber is an optical fiber with an array of air holes that run parallel to each other and lengthwise down the fiber, which modifies and changes the effective refractive index and defines the light waveguide. Light can be confined within this type of fiber by two distinct mechanisms. First, light guidance can be obtained through a fiber with periodically arranged air holes by photonic band gap effects. Second, light guidance can be obtained from volume-averaged refractive index effects, which does not rely on periodicity of the air holes. The florite fiber formed by using holey structure can be single core florite fibers, double cladding single core florite fibers and double clad multiple core florite fibers.

The advantages of this inventive structure for the high power RGB or ROGB lasers are: (1) the effective refractive index difference between the core and clad is managed by the 2D air pipes along the fiber optical axis, and the effective refractive index difference can be very small. Hence the core size can be increased while maintaining its single mode operation. This prevents the fiber core from damage and photodegradation caused by high lasing and pump power density; (2) the cladding size can be enlarged for easy coupling of the pump light; (3) the "photodarkening effect" is greatly reduced in absence of such materials as $PbF_2$ for effective refractive index change between the fiber core and clad, which is particularly true at short wavelengths; (4) the propagation loss due to the photonic band gap effects is reduced.

BRIEF DESCRIPTION OF THE DRAWINGS

FIG. 1a is a schematic side view showing a diode pumped upconversion ROGB fiber laser according to this invention;

FIG. 2a is a sectional view of an LMA single mode fluoride glass fiber with a double-clad or multiple-clad structure used in the lasers as shown in FIGS. 1a and 1b;

FIG. 2b is a sectional view of a fluoride glass with multiple waveguide gain regions used in the lasers as shown in FIG. 1a and FIG. 1b;

FIG. 5 is a schematic side view showing an alternative upconversion fiber laser embodiment of the present invention illustrating a different cavity scheme wherein a number of laser diodes are combined to pump the inner clad of the fiber;

FIG. 6b shows the sequential output from a multiple wavelength fiber laser with FBGs as the rear mirror.

DETAILED DESCRIPTION

Figure 1B:
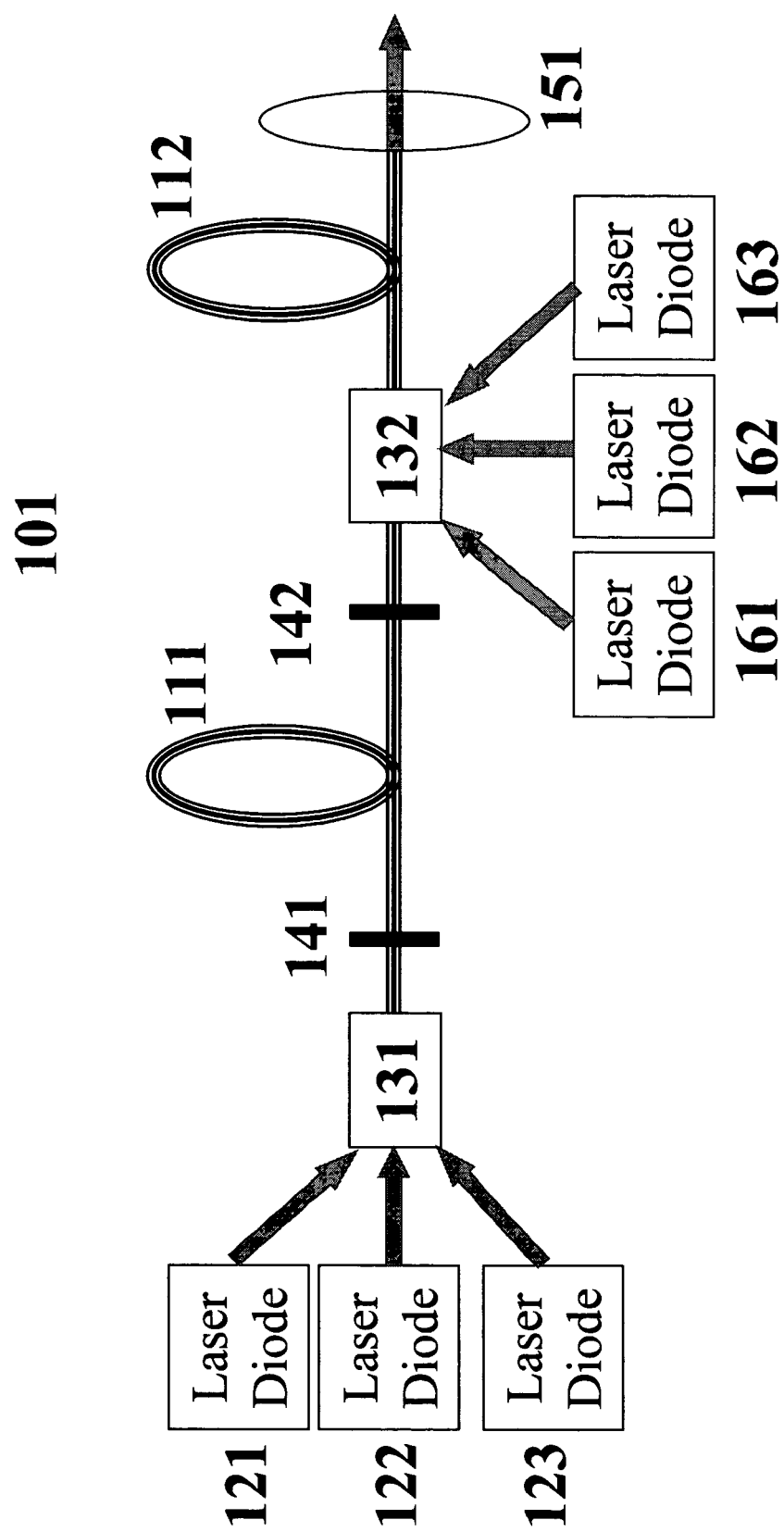
FIG. 1b is a schematic side view showing a diode pumped upconversion fiber MOPA according to this invention.

The foregoing and other objects, aspects and advantages will be better understood from the following detailed description of the present invention with reference to the drawings.

FIG. 1a is a schematic representation of a fiber laser device 100 for generating ROGB laser light by means of an upconversion process. Said device 100 comprises a laser diode 120, which emits a light beam having a wavelength of, e.g., 850 nm; a coupling element such as a set of focusing lenses or a thermally-diffused expanded core (TEC) fiber, 130; and a resonator cavity accommodating a laser gain fiber 110 arranged between a rare mirror 140 at the pump end and an output coupler 150 at the other end. The laser cavity mirrors 140 and 150 can either be external mirrors or direct coatings on the fiber ends or butt-coupled silica FBGs with or without chirp. The fiber laser 100 provides one or more laser outputs at wavelengths of 491 nm, 526 nm, 635 nm, and 720 nm, or at other wavelengths.

The rare mirror 140 is transparent to the pumping light and reflects all the ROGB light generated in the laser gain fiber 110. The output coupler 150 exhibits total reflection to the pump light, a limited transmittance to the blue, and more transmittance to green and red lights.

A suitable semiconductor laser used as the pump light source is, for example, a GaAlAs laser. Other state of the art semiconductor lasers with suitable characteristics may be used alternatively. Commercially available mirrors can be used as the butt-coupled mirrors for the device. Depending on the needs, the mirrors can be deposited on a quartz glass substrate or on the ends of the glass fiber in the form of thin layers by low temperature low stress ion assisted vapor deposition. The output coupler may have a transparency of 0.2% to 20% for the blue light, 10% to 96% for the green light, and 20% to 96% for the red light.

FIG. 1b shows another preferred embodiment of the present invention. As can be seen from that FIG. 1b, a diode pumped upconversion fiber MOPA 101 comprises a master oscillator 111 and a power amplifier 112. The master oscillator 111 is formed between cavity mirrors 141 and 142, and energized by a set of pigtailed laser diodes 121, 122, 123, . . . through a pump combiner 131, which can be WDM or PBC or a fiber bundle. Similarly, the power amplifier 112 is pumped by a set of pigtailed laser diodes 161, 162, 163, . . . through a pump combiner 132, which can be WDM or PBC or a fiber bundle, and outputs through a coupler 151. As can be appreciated by those skilled in the art, the number and characteristics of pumping diodes can vary depending on the needs.

With reference to FIG. 2a, where a sectional view of an LMA single mode fluoride glass fiber with a double-clad or multiple-clad structure is shown. Starting from the innermost component, an LMA single mode doped core 201, an inner cladding 202, an optional glass cladding 203, and a polymer cladding 204 are comprised.

FIG. 2b shows alternative structures of the glass fiber 110. In particular, a double clad fiber having one, two or three waveguide gain regions of circular cross section with a diameter of 3 μm is illustrated. The waveguide 211 is composed of a heavy-metal fluoride glass and co-doped with Pr and Yb for generation of various colors.

As can be seen from the left part of FIG. 2b, where the glass fiber 110 is composed of an inner clad 212 with a rectangular shape and size of 20×40 μm$^2$ and an outer cladding 213 with a diameter of approximately 125 μm. Said inner cladding 212 comprises a fluoride-containing glass composition, having a refractive index which is smaller than that of the waveguide gain region. The outer cladding 213 consists of a fluoride-containing glass composition, having a refractive index, which is smaller than that of the inner cladding. Said waveguides 211 are separated from each other with an equal distance of 10 μm.

Another preferred structure of the glass fiber 110 is shown in reference to the right part of FIG. 2b. With this embodiment, the inner clad 212 now has a cross-section of circular shape and the waveguides 211 are distributed evenly. As can be appreciated by those skilled in the art, the number of waveguides and the associated wavelengths can vary, depending on applications.

Figure 3:
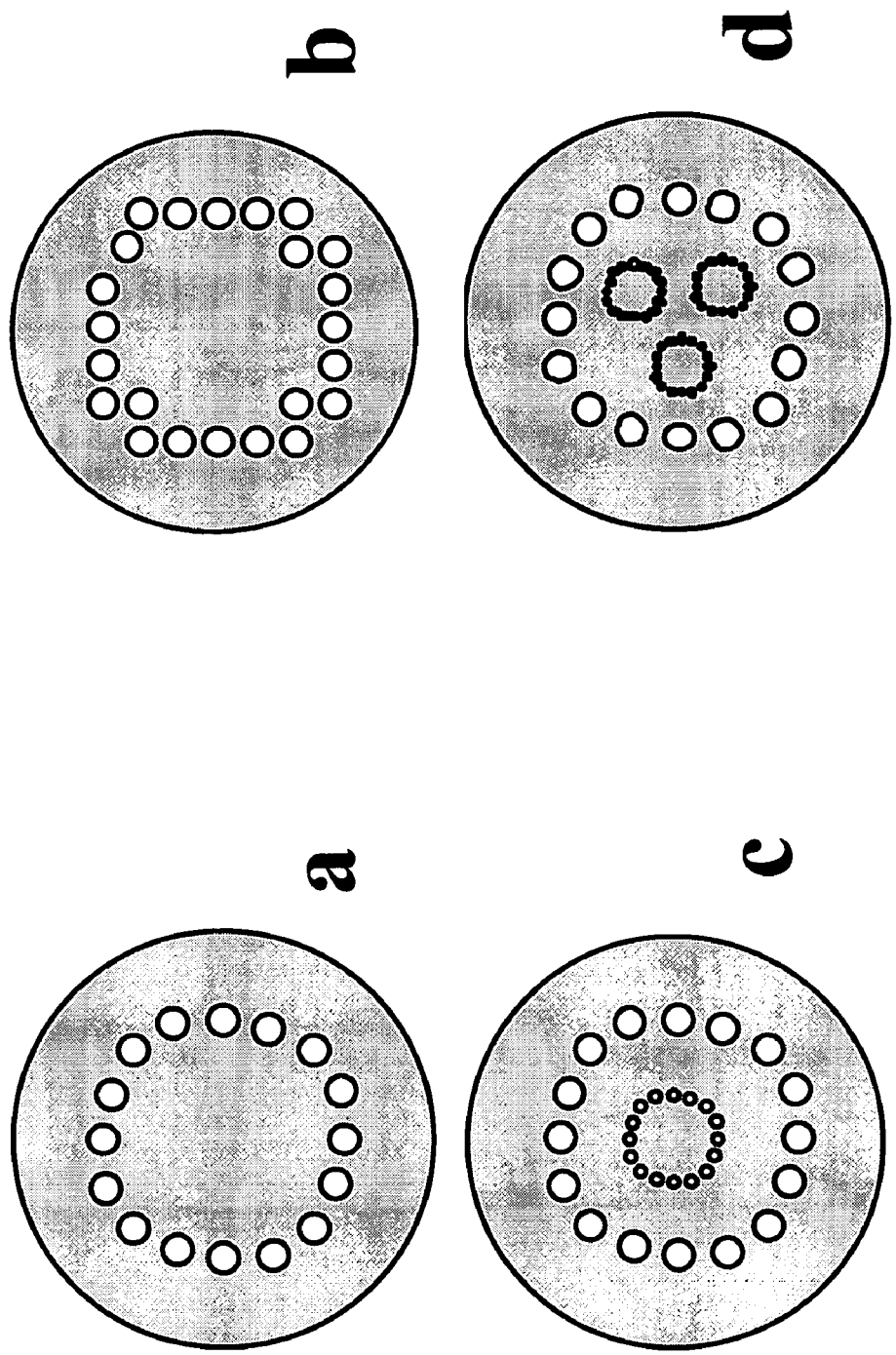
FIG. 3a shows a cross section of a holey fiber based on photonic band gap.
FIG. 3b shows a cross section of a holey fiber based on the average refractive index guidance effect where the holey cladding region is not necessary to be symmetrical.
FIG. 3c shows a cross section of a double cladding fiber using the holey structure.
FIG. 3d shows a cross section of a multiple cladding fiber using the holey structure.

Turning now to FIG. 3, there is shown in cross-sectional schematic view alternative embodiments of this invention. In particular, holey optical fiber is used for light confinement along the florite optical fiber core regions by means of the photonic crystal effect or the average refractive index guidance effect.

As shown in FIG. 3a, a holey fiber has a solid core region surrounded by a holey cladding region characterized by hole diameter of around 0.5 μm, varying from 0.1 μm to 1.0 μm, and a hole spacing around 0.8±0.5 μm. The core region located at the center is a florite fiber doped with one or more kinds of active ions, while the cladding region is composed of florite fibers either doped with active ions or without doping. With periodic arrangement of air holes, light confinement is realized via photonic band gap effects.

FIG. 3b shows a slightly modified holey geometry, wherein the air holes are distributed unsymmetrically with respect to the core center. With this configuration, light guidance is primarily based on volume average refractive index effects.

FIG. 3c shows a cross section of a double cladding single core florite fiber. In addition, and with reference to FIG. 3d, multiple gain regions can also be defined in a florite fiber with the holey structure.

Figure 4A:
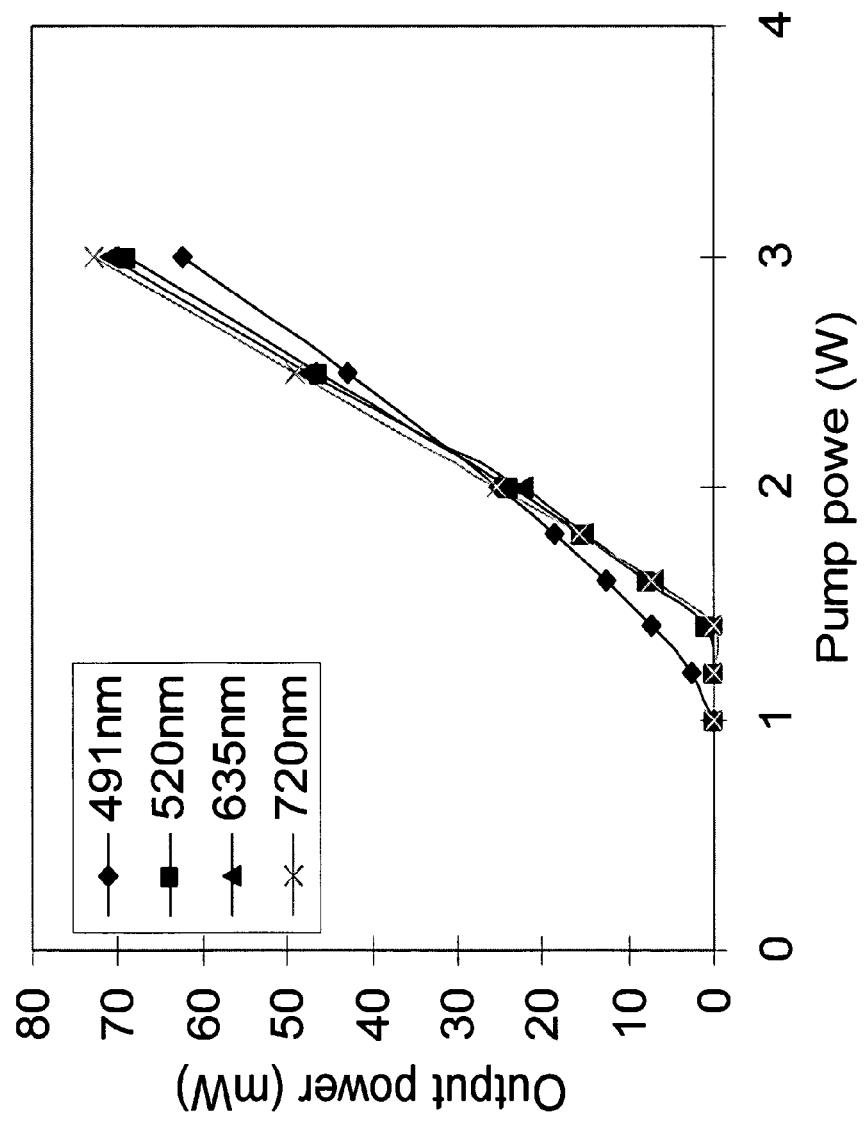
FIG. 4a shows the pump input power versus the output power at red, orange, green and blue wavelengths from a double clad fiber of one gain region.

With reference now to FIG. 4a, there is a graph which shows the pump input power versus the output power at red, orange, green and blue wavelengths from the double clad fiber with one gain region when pumped by a laser diode at 850 nm wavelength, assuming the pump light coupling efficiency is 60%. The output power ratios among different wavelengths are tuned to be 1:1. A continuous output power of 60 mW at each wavelength is obtained when the pumping power is 3 W. With a careful design, the reflectivity-wavelength characteristics of output coupler can be optimized and the laser output powers at different wavelengths keep almost constant ratios.

For this calculation, the single mode fiber has a length of 0.4 m. The Pr and Yb doping concentrations are, respectively, 3000 ppm and 20000 ppm. The core diameter is 3 μm with an NA of 0.11. The inner clad has a diameter of 10 μm and NA of 0.20. The outer clad has a diameter of 125 μm. The cutoff wavelength is 450 nm.

Figure 4B:
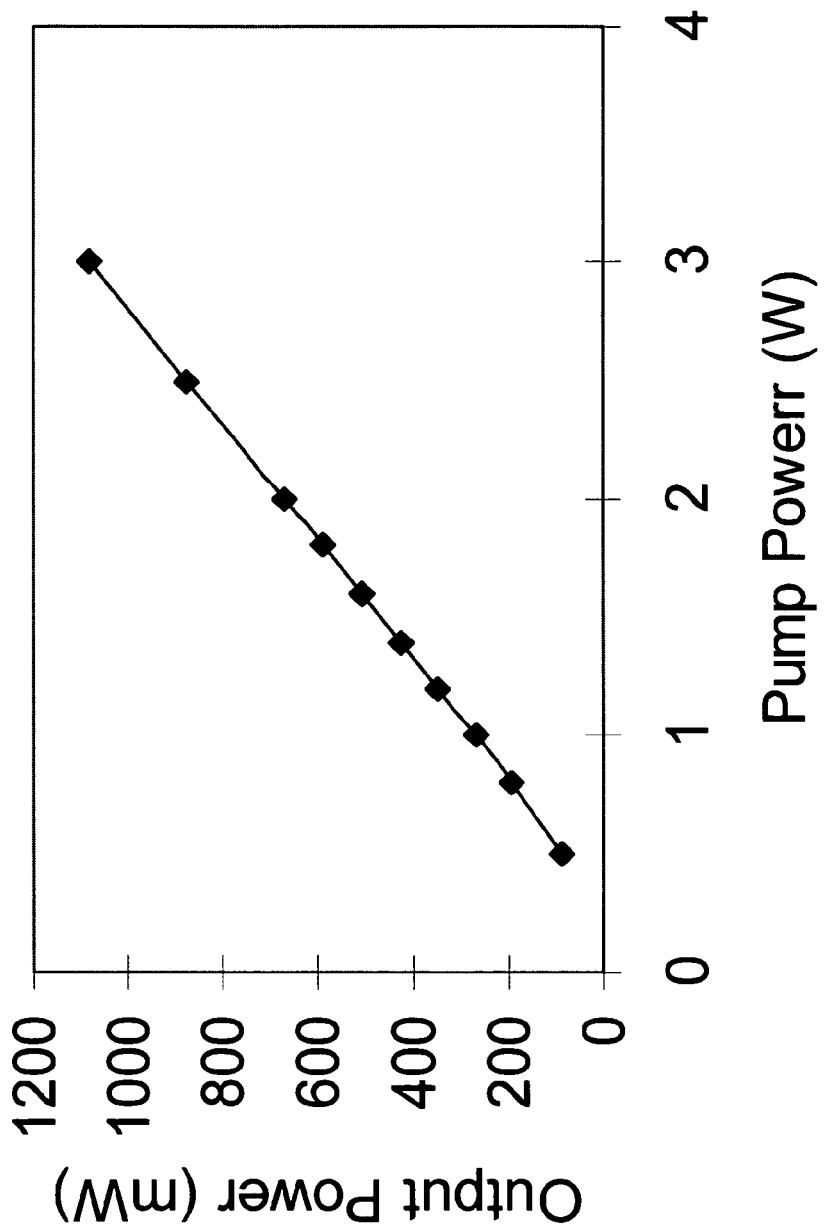
FIG. 4b shows the maximum output power at 635 nm from one gain region when the fiber laser is pumped at 850 nm with a 3 W laser diode.

Another curve plotted in FIG. 4b shows that an output power of over 1 W is obtained from an one gain region fiber laser operating at 635 nm wavelength when pumped by a 3 W laser diode. For one-meter long fiber laser with an optimal output coupler of 25% transmittance, the laser efficiency is about 35%. Assuming that the primary output power limiting factor is possible fiber end damage caused by the high density pump light, the two gain region or three gain region fiber lasers will almost double or triple the maximum output power compared with the one gain region fiber laser.

It is important to note that the present invention may have a variety of alternative embodiments. As an example, FIG. 5 shows an upconversion fiber laser 500, wherein the gain medium 510 is pumped by a group of diodes 520, each emanates light at a desired wavelength. Pump lights emanating from different laser diodes at different wavelengths are combined through a WDM combiner 560, and then coupled to the inner clad of the glass fiber through reshaping and coupling optics 530. As is shown in that FIG. 5, three pump diode lasers are combined via the WDM combiner. For a dual wavelength pumping, two absorption-match wavelengths from, e.g., 850 nm and 1010 nm laser diodes are combined to pump a Pr doped multiple gain region, resulting in laser operation at wavelengths of around 491 nm, 526 nm, 635 nm and 720 nm.

Advantageously, different doping or co-doping schemes of the waveguide gain regions including Nd, Tm/Yb, Ho, and Er can be used for producing desired wavelengths. For example, 450 nm blue light output can be obtained from Tm doping. Another advantage of this embodiment is that the relative position of each waveguide gain region can be adjusted to optimize the balance of RGB operation.

Figure 6A:
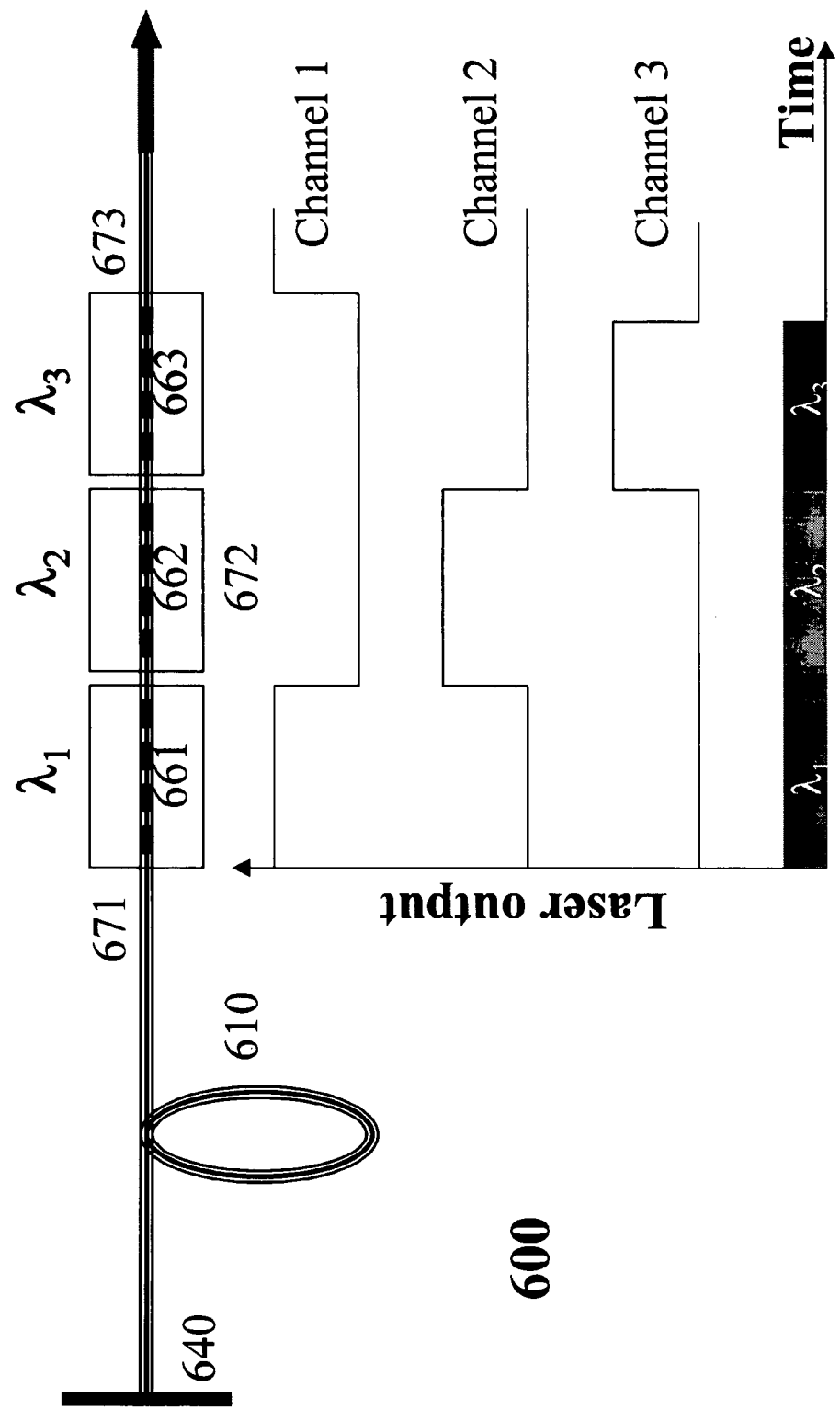
FIG. 6a shows the sequential output from a multiple wavelength fiber laser with FBGs as the output couplers.

FIG. 6a and FIG. 6b show the sequential output from a multiple wavelength fiber laser 600. The output coupler for the fiber lasers may be constructed from Fiber Bragg Gratings (FBG) with peak reflections at the corresponding lasing wavelengths. As shown in these figures, the Fiber Bragg Gratings 661, 662, 663 are, respectively, attached to PZT bars 671, 672, 673, which stretch with applied electrical signals. When a voltage is applied to the PZT, the FBG is stretched, resulting in shift of the reflection peak of the FBG. As a consequence, the cavity has a high loss at this particular wavelength.

As shown in FIG. 6a, at any time there is only one unstretched FBG. Its peak reflectivity determines the lasing wavelength. The other two wavelengths corresponding to stretched FBGs are suppressed due to the high losses caused by the reflection shifts of these FBGs. This configuration can also provide more than one wavelength operations simultaneously.

Turning our attention to FIG. 6b, there is shown an alternative embodiment. In particular, the FBGs 661, 662, 663 are used as the rear mirror, while the output coupler 650 is a mirror with fixed transmission values at different lasing wavelengths.

As a special example, the three FBGs provide three reflection peaks corresponding to Red, Green, and Blue wavelengths, respectively. When a voltage is applied to a FBG, its reflection peak is tuned away from the corresponding laser wavelength, which terminates the laser output. By removing the applied voltage, the FBG returns to its original reflection peak and the laser action is resumed.

For color projection display applications, RGB (red, green, blue) colors at red 635 nm, green 526 nm, and blue 455 nm with an average power ratio of 0.8:1.0:1.25 are preferred. An average output power of 0.8 W, 1 W and 1.25 W at RGB wavelengths can be obtained from the inventive devices as shown in FIG. 6a or 6b, provided that the pump power is 10 W at the wavelength of 850 nm and the pump light coupling efficiency is 60%. Other assumptions include: the single mode fiber has Pr and Yb doping concentrations of 3000 ppm and 20000 ppm, respectively; the core diameter is 3 μm; the inner clad diameter is 10 μm; the outer clad diameter is 125 μm; the cutoff wavelength is 455 nm; the NA of the core is 0.11; and the NA of the inner clad is 0.20. With carefully designed reflectivity-wavelength characteristics of FBG output couplers, the average output power can be set to different ratios for different applications.

Of course, it will be understood by those skilled in the art that the foregoing is merely illustrative of the principles of this invention, and that various modifications can be made by those skilled in the art without departing from the scope and spirit of the invention.

What is claimed is:

1. A fiber upconversion laser for producing visible output at multiple wavelengths including the wavelengths of blue, green, orange and red light comprising: an optical fiber including multiple waveguide gain regions embedded within a common inner cladding of lower refractive index, wherein each gain region supports propagation of only a single transverse mode of optical radiation at one wavelength therein, and is within an outer cladding of lower refractive index than the cladding material forming said inner cladding, wherein each of said waveguide gain regions are doped with one or more active ionic species; reflectors, defining an optical cavity, for providing optical feedback of said optical radiation propagating within each of said waveguide gain regions to establish resonant laser conditions for each of said gain regions; and a light pump for producing an excitation beam and pumping one or more active ionic species by one or multiple pump wavelengths from one or both ends of the optical fiber, wherein one or more Large Mode Area (LMA) waveguide gain regions are doped with $Pr^{3+}$ ions to a concentration of less than 0.5 wt % and greater than 0.05 wt % $Yb^{3+}$ ions to a concentration of greater than 0.5 wt % wherein for said $Pr^{3+}$ ions and said $Yb^{3+}$ ions, said excitation beam between 780 nm and 900 nm excites populations of said $Yb^{3+}$ ions which thereafter transfer energy to populations of said $Pr^{3+}$ ions which are independently excited by said excitation beam to an energy level from which said populations of said $Pr^{3+}$ ions and said populations of said $Yb^{3+}$ ions participate in a photon avalanche process which increases said populations of said $Pr^{3+}$ ions at said energy level, said populations of said $Pr^{3+}$ ions lasing at said multiple wavelengths of blue, green, red and orange visible light.

2. The fiber upconversion laser of claim 1 wherein said light pump comprises a multimode semiconductor diode laser pump module for emitting one or more laser wavelengths.

3. The fiber upconversion laser of claim 1 wherein said reflectors comprise fiber Bragg grating directly connected onto ends of said fiber or written onto said optical fiber by laser pulses near ends of said fiber.

4. The fiber upconversion laser of claim 1 wherein said reflectors comprise chirped fiber Bragg grating directly connected onto ends of said fiber or written onto said optical fiber by laser pulses near ends of said fiber.

5. The fiber upconversion laser of claim 1 wherein said gain regions are spaced to allow light interaction among neighboring gain regions thereby permitting optical radiation generated in one gain region evanescently to be coupled to at least one adjacent gain region and provide pumping thereto.

6. The fiber upconversion laser of claim 1 wherein said inner cladding region has a circular or rectangular or elliptical cross-section.

7. The fiber upconversion laser of claim 1 wherein said multiple waveguide gain regions are arranged in a linear or circular configuration within the inner clad.

8. The fiber upconversion laser of claim 1 wherein said multiple waveguide gain regions are arranged symmetrically or non-centrosymmetrically within said cladding region embedding said waveguide gain regions.

9. The fiber upconversion laser of claim 1 wherein one or more of said waveguide gain regions are doped with $Tm^{3+}$ to a concentration of less than 0.5 wt % and greater than 0.05 wt % and gain regions containing Pr/Yb are placed close to neighboring gain regions containing Tm such that the laser at 645 nm wavelength from Pr/Yb gain region will be absorbed and converted to blue at 455 nm.

10. The fiber upconversion laser of claim 1 wherein the inner cladding is doped with Nd active ions, and one or more waveguide gain regions are doped with Tm such that when the inner clad is pumped with 809 nm and 850 nm laser diodes, the generated 1.06 um laser from the inner clad and 635 nm from the neighboring waveguide gain region doped with Pr/Yb are used to pump the waveguide gain region doped with Tm whereby said laser provides two or more visible colors selected from the following wavelengths consisting of: 455 nm, 526 nm, 635 nm and 720 nm.

11. The fiber upconversion laser of claim 1 wherein the core, inner clad and outer clad are all defined by holey pipes in situated parallel with the central axis of the fiber based on photonic crystal effects or refractive index guidance effects.

12. The fiber upconversion laser of claim 1 wherein the output permits sequential wavelength operation through the effect of tunable Fiber Bragg Gratings or through the effect of one or more optical switches.

13. The fiber upconversion laser of claim 1 wherein the output permits multiple wavelength operation simultaneously through the effect of tunable Fiber Bragg Gratings or through the effect of one or more optical switches.

14. The fiber upconversion laser of claim 1 with sequential output of wavelengths of one or more of the ROGB plus IR from multiple gain regions.

15. The fiber upconversion laser of claim 1 having simultaneous output of wavelengths of one or more of the ROGB light plus IR from multiple gain regions.

16. The fiber upconversion laser of claim 1 having a large-mode-area waveguide gain region with a core diameter from 3 µm to 35 µm, which supports a TEM00 mode at visible wavelengths.

17. The fiber upconversion laser of claim 1 having an outer cladding with a core diameter of 40 µm to 500 µm, overlying which is a lower refractive index material, overlying which is a layer of polymer, thereby producing a double-clad or structure which serves as a waveguide for pump light.

18. An apparatus for producing high-power Red, Orange, Green, Blue (ROGB) lasers for applications of projection displays and biomedical or other instrumentation comprising means of:

using high power multimode or broad-area laser diode pump sources or high power diode-laser-pumped fiber-laser pump sources without risk of undesired thermal effects;

pumping one or multiple gain regions via upconversion process by the use of laser diode pump sources optically coupled at one end of said inner clad fiber to both the waveguide gain regions and inner cladding of said fiber;

combining lights from two or more pump sources with different wavelengths within the broad absorption band of the active ions in a wavelength-division multiplexer before being coupled into said optical fiber;

combining two pump sources of same wavelength but with crossed linear polarizations in a polarization beam combiner to double the pump brightness;

confining the pump light to said inner cladding and waveguide gain regions;

generating population inversion in each gain region, doped with an active ionic species or co-doped with several active ionic species capable of undergoing upconversion excitation;

coupling optical radiation generated in one gain region to at least one adjacent gain region and provide pumping thereto;

guiding light via photonic band gap effects or volume average refractive index effects;

confining the upconversion laser light to multiple waveguide gain regions formed within an inner cladding having a refractive index lower than that of the waveguide gain regions;

supporting propagation of single transverse mode of each laser light at one of the RGB or ROGB wavelengths in each waveguide gain region;

using chirp grating for low-noise, speckle-reduction laser output;

operating different output wavelengths sequentially through the effect of tunable Fiber Bragg Gratings through the effect of one or more optical switches.

19. An apparatus of claim 18 further comprising a fiber master oscillator and a fiber power amplifier, wherein:

said fiber master oscillator is pumped by a number of laser diodes through a pump combiner such as WDM, PBC or fiber bundle; and said fiber power amplifier is pumped by a number of laser diodes through a pump combiner such as WDM, PBC or fiber bundle.

* * * * *